Patented Jan. 10, 1939

2,143,332

UNITED STATES PATENT OFFICE

2,143,332

PROCESS FOR THE PRODUCTION OF CELLULOSE ESTERS

Otto Sindl, Paris, France, and Georg Frank, Moedling, near Vienna, Austria, assignors to "Afag" Finanzierungs A. G., Schaffhausen, Switzerland No Drawing. Application September 25, 1936, Serial No. 102,629. In France October 10, 1935

5 Claims. (Cl. 260—230)

The properties of cellulose esters, particularly of cellulose acetate, are essentially determined by their content of acyl radicals. It is known that the products having the highest content of acyl radicals, a content corresponding to the triester, are unsatisfactorily compatible with solvents and plasticizers, and that films, threads, varnishes, plastics, and so forth made therefrom have unsatisfactory qualities, especially as regards ageing. On the other hand, products in which the available hydroxyl groups of the cellulose are not completely esterified by acyl radicals are superior in this respect. Thus, the quality of the product in this respect improves rapidly if the content of acyl radicals decreases, but it deteriorates on still further decrease of the acyl content. The optimum qualities for the different products may be found for instance in the case of cellulose acetates at acetic acid contents varying between 58% and 61%.

On application of the homogeneous esterification process (solvent method), in the course of which the cellulose ester produced is dissolved in the esterification mixture in proportion to its formation, acyl radical contents are obtained which are lower than those of the triester by a partial hydrolysis following the esterification proper. In the case of esters prepared with conservation of their fibrous structure, i. e. prepared in the presence of diluents which are inert towards the cellulose ester, an analogous partial saponification with the same favorable results could not be obtained unless the cellulose ester destined to be partially saponified is preliminarily dissolved. However, by proceeding thus the economic advantages deriving from the possibility of economically regenerating the esterifying agent in the non-solvent processes, i. e. processes carried out in heterogeneous medium (suspension method) are lost. On the other hand when trying to saponify partially a cellulose ester produced according to the so-called non-solvent method by utilizing one of the known hydrolyzing agents without dissolving the said ester, it has always been observed that the products obtained are not homogeneous and include bodies having varying acyl radical contents, even if hydrolyzing media of strong swelling power are applied. This is due to the fact that the conditions under which hydrolysis of a molecule is effected, vary according to its position in the texture. The particles more easily accessible to the hydrolyzing agent are more effectively attacked than those less easily accessible to the same. Esters produced in this way are practically not usable at all, or are hardly usable, since they are not homogeneous.

The production of cellulose esters without destruction of the fibrous texture and with acyl contents distinctly lower than the triester is however, in a general way, possible without the aforesaid disadvantages, if there is introduced into the cellulose during the esterification two or more kinds of acyl radicals. Thus a mixed ester is produced as an intermediate product. Subsequently, by a selective eliminating method, one or more kinds of these acyl radicals are eliminated and hydroxyl groups are substituted. This method enables the production as a final product of simple or mixed fibrous primary esters, which are extremely homogeneous as regards the acyl content, and which have an acyl content distinctly lower than that of the triester. It is evident that the kind of acyl radicals to be eliminated has to be chosen so that their selective elimination is possible. On the other hand, the elimination method applied must be adapted to the kind of acyl radical which has to be removed.

It has been found that in order to apply the method described above in a general way, it is particularly advantageous to use the radical derived from sulphuric acid as the acyl radical to be eliminated. Sulphuric acid is the catalyst which has been longest known and most often applied for the production of cellulose esters. It has been used as catalyst practically without exception in all processes employing the so-called homogeneous or solvent-method, i. e. where the cellulose ester formed is dissolved in the esterification bath. It is only because no better catalyst has been found that this same acid has been generally used as catalyst for carrying out the so-called heterogeneous-method processes, as it combines with the cellulose molecule and it has been found difficult to eliminate the sulphuric acid radicals combined in this way, and which are capable of provoking later instability, without dissolving the cellulose ester. It is for this reason that attempts have been made to utilize for this process either catalysts which form no combinations with the cellulose, such as for instance perchloric acid and its salts, zinc chloride alone or associated with hydrohalogenic acid, methane mono- or disulphuric acid, or else to utilize sulphuric acid as catalyst under conditions such that the possible fixation of the sulphuric residues are narrowly limited, as is for example described in British patent specification No. 381,991 of August 6, 1931.

Recently, processes have been described permitting the efficient elimination without dissolution of the cellulose ester, of the residues of sulphuric acid or the radicals derived therefrom resulting from the use of sulphuric acid as catalyst, with a view to stabilizing the cellulose ester; an example of such a process is furnished by the British patent specification No. 411,260 of June 7, 1934.

Surprisingly enough, it has now been discovered that under appropriate conditions it is possible advantageously to use the fixation of the sulpho-radicals or, more properly, the sulphuric acid radicals on the cellulose molecule, during the esterification with other acyl radicals following it by the selective elimination of the sulphuric acid residues for regulating within wide limits the final acyl content of cellulose esters, and thus to obtain products of highest homogeneity with respect to the acyl content. Applying this process with a view to obtaining as final product a cellulose ester having an acyl content markedly lower than that of the triester, the fixation of sulpho-radicals must thus be adjusted and rather be favoured instead of prevented as much as possible.

The process above defined is however not limited to the use of compounds containing radicals derived from sulphuric acid, having as double function to act as catalysts and to furnish at the same time radicals. To the compound supplying the sulpho-radicals, other catalysts can be added, either such which are able to combine also with the cellulose, or such which do not combine with the same, e. g. phosphoric acid, hydrochloric acid, perchloric acid and its salts, methane mono- or disulphuric acid, etc. The utilization of such supplementary catalyzing agents will be advantageous more particularly if the compound furnishing sulpho-radicals exercises no, or insufficient, catalyzing power towards esterification.

The ratio between the acyl radicals and the free hydroxyl groups forming part of the fibrous ester finally obtained can be regulated and determined in advance by the simultaneous introduction of a varying quantity of sulphuric acid radicals with the acyl radicals forming part of the ester. The composition of the primary mixed sulpho-ester varies according to the conditions chosen for the esterification. It depends above all on the proportion between the respective quantities of cellulose and of the agent furnishing the sulpho-radicals (usually sulphuric acid). If, for instance, small quantities of sulphuric acid are used in the esterification mixture, the quantity of sulpho-radicals combined per gram molecule of cellulose is relatively small. After a selective elimination of these groups rather strongly esterified products will be obtained as a consequence. For instance, in the case of acetylation, esters containing from 61% to 62% of acetic acid will be obtained, an acetic acid content of 62.5% corresponding to the theoretical triacetate. If, during the esterification, a larger quantity of sulphuric acid is used, the amount of sulpho-radicals fixed per gram molecule of cellulose is larger, and, after a selective elimination, products richer in hydroxyl groups are obtained which are thus less esterified, and consequently, more valuable as regards their practical utilization. Thus, by using the appropriate quantities of sulphuric acid relative to the cellulose used, acetates may be obtained with lower acyl contents, e. g. from 61 to 58% and less. The decrease in the acyl contents brought about by the increase in the quantity of sulphuric acid, is an extremely surprising and unexpected phenomenon, if the effects are considered which are known concerning the action of sulphuric acid as a catalyst.

Besides the proportion between the quantities of cellulose and sulphuric acid employed, the ratio between the quantities of sulphuric acid and the acylating agent (for instance acetic anhydride) introduced into the esterifying mixture is of importance for the composition of the sulpho-ester formed, because the reaction of the hydroxyl groups of cellulose with sulphuric acid or with the anhydride of fatty acid is directly proportional to the respective concentrations, i. e. to the ratio of these compounds in the esterifying mixture. If the quantity of acylating agent (for instance acetic anhydride) is increased, the sulphuric acid concentration remaining unchanged, the quantity of sulpho-radicals fixed per gram molecule of cellulose decreases. The concentrations of sulphuric acid and of anhydride prevailing at the end of the esterification process are essentially the determining factor in this procedure. Moreover, the composition of the mixed sulpho-ester produced depends on the nature of the diluent employed during the esterification (this diluent preventing the dissolution of the cellulose ester formed), as well as on the manner in which the esterification is effected. The diluents which dissolve only a little sulphuric acid, or do not dissolve this acid at all, such as hydrocarbons, increase the percentage of sulpho-radicals in the mixed sulpho-ester formed, whereas the diluents having a higher solvent power for sulphuric acid, such as esters and ethers, cause decrease of this percentage.

In the case of acetylation, and particularly when as diluent, liquids are used in the acetylation bath, which do not dissolve the sulphuric acid used as catalyst, or dissolve this acid to only a slight extent, the quantity of acetic acid employed right from the start, as well as the quantity which in addition is formed during the acetylation by decomposition of anhydride, are of great importance, acetic acid being a good solvent for sulphuric acid. It can thus be understood that, for instance, according to the degree to which acetic acid used in a preliminary treatment or in a mixture with sulphuric acid is separated from the cellulose, the quantity of sulpho-radicals fixed on the cellulose will vary, and thus, as a result, also the acyl contents finally obtained. It can thus be understood that during an acetylation employing several acetylation baths applied gradually and containing decreasing quantities of acetic acid with progression of the acetylation, an increase in the quantity of sulpho-radicals, and in this way a decrease in the final acetyl-contents, is obtained. It is evident that the same happens if esterification is attained by means of acylating agents other than acetic anhydride.

The manner in which the reaction is effected is of importance with regard to the homogeneity of the mixed ester obtained. By effecting esterification slowly at low temperatures, and with considerable dilution of the acylating agent (anhydride of a fatty acid) and of the sulphuric acid, by means of a diluent possessing a good solvent power for sulphuric acid, as well as, should it be necessary, by gradual addition of sulphuric acid and of the acylating agent, a homogeneous distribution of the sulpho-radicals may be obtained, even if these are introduced in considerable quantities.

If large quantities of sulphuric acid are used in the esterification mixture, and if thus mixed esters are obtained which are rich in sulpho-radicals, then, too strong a degradation of the cellulose must be avoided, for example by an intense refrigeration, especially at the commencement of the esterification, because of acidolysis. There is another way of preventing this danger: a part or the whole of the sulpho-radicals can preliminarily be fixed by means of a treatment with a mixture of fatty acid and sulphuric acid, instead of fixing them during the esterification process. The quantity of water which is present in such a bath used during a preliminary treatment with a mixture of sulphuric and fatty acid, as well as the duration of such treatment, as well as the applied temperature, are important with respect to depolymerization which is caused and to a less degree with respect also to the quantity of fixed radicals.

To produce mixed sulpho-esters of cellulose one is not limited to the use of sulphuric acid. In an analogous way all compounds permitting the fixing of sulpho-radicals on cellulose may be used, as for instance chlorsulphonic acid, sulphur trioxide, sulphuric acid esters or semi-esters such as methylated sulphuric acid and others, as well as sulphuryl chloride. These compounds may also be brought into reaction with cellulose during a preliminary treatment, without using fatty acid as diluent. In the same way as during the esterification, other diluents may be used for this operation, such as hydrocarbons and derivatives thereof. Finally, the cellulose may preliminarily be treated with a gas containing the reactant, as for instance in the case of sulphur trioxide.

For the introduction of fatty acid radicals, anhydrides are preferably used; other acylating agents, e. g. ketens, may also be used for this purpose. Either a single acylating agent may be used, or a mixture of such agents. As diluents for the esterification itself, all the compounds adapted to act as such may be utilized as long as they have been deprived of dissolving power towards the cellulose ester produced, and are capable of mixing with the acylating agents whilst being indifferent towards the latter, such as hydrocarbons and their substitution products, nitrated and halogenated derivatives, ethers, esters and the combinations of these compounds such as ester-ethers, and finally oxides, such as for instance sulphur dioxide. The process according to the present invention is chiefly intended for the production of cellulose acetate, but it can also be used for the production of other simple or mixed cellulose esters.

The elimination of the bound sulphuric acid from the mixed sulpho-esters of cellulose produced by one or other of the methods described above is effected by treating these esters with compounds which contain organic acyl groups bound to alkoxy groups, which compounds are chiefly represented by the alkyl esters of the fatty acids as well as derivatives of these compounds, in which for example the alkyl group or acyl group is substituted either by one or several oxalkl groups or by one or several further esterified acyl groups, the substitution also being possible by both kinds of the said groups in one molecule.

The compounds in which the organic acyl radical is formed by the acetic acid residue particularly may be used. The classes of compounds mentioned above are represented by the general formula R'(OR'')$_n$(COOR''')$_m$. The expressions between brackets respectively designate only the kind of groups, and not the character of their bindings. R', R'' and R''' stand for a hydrocarbon residue as well as such a residue which has undergone a substitution by halogen residues, nitro residues or others, indifferent towards the cellulose ester. R' may be absent or may indicate hydrogen. The indices $n$ and $m$ may be equal to or greater than one; $n$ may also be equal to zero. If these compounds are used for effecting a selective elimination, the mixed sulpho-ester of cellulose submitted to this treatment maintains its content of organic acyl radicals. On the other hand, by the use of for instance lower fatty acids diluted by appropriate diluents, such a mixture being also able to produce an elimination of the sulphuric acid, an increase of the content of organic acyl radicals occurs. Finally, if for this elimination, water, alcohol or other liquids containing hydrolyzing agents are used, hydrolysis of the organic acyl radicals takes place, but not uniformly however and products of inferior value are thus obtained since they are non-homogeneous with regard to the content of organic acyl radicals. Moreover, it is well known that it is really impossible to transform acetates with the original cellulose texture conserved into homogeneous fibrous esters of lower content of acyl radicals by saponification in heterogeneous medium. However, it is admissible, in conformity with the present invention, to use liquids with hydrolyzing action, such as water, alcohol and others, to eliminate residues of the stabilizing liquids, after having sufficiently eliminated by a preliminary stabilization treatment the residues of hydrolysis-provoking mineral acids.

The elimination of the sulphuric acid radicals is improved by raising the temperature and in general is effected the more rapidly and the more efficiently the higher the temperature which is employed. So as not to provoke an increase in the content of acyl radicals, before heating the mixed sulpho-ester with the alkyl ester, the residues of the esterification bath, i. e. the fatty acid and fatty acid anhydride, must first carefully be removed from the mixed ester as completely as possible, by utilizing an alkyl ester or some other appropriate washing liquid and by applying an adequate technical method, such as extraction, displacement, washing with or without previous squeezing, centrifuging or finally filtration with suction; it is only then that the mass can undergo a treatment at elevated temperature. Besides this it is useful to eliminate, by means of a washing at low temperature, which may be applied before the treatment at elevated temperature, the major part of the sulphuric acid or of any other compound used to furnish sulpho-radicals retained by the fibrous ester by adsorption and not by chemical binding. Preferably, therefore, for this washing at low temperature liquids will be used having a strong dissolving power for sulphuric acid.

In order to obtain a perfect elimination of sulpho-radicals, the treatment with alkyl esters at elevated temperature must be applied repeatedly to the mixed cellulose ester, when no continuous elimination is effected of the acid constituents which dissolve in the alkyl ester and which rapidly diminish the stabilizing power of the latter. The continuous elimination may be effected, for instance by treating the alkyl ester with a non-soluble neutralizing agent, such as barium or calcium carbonate. The basic silicates may also be used to the same effect; they act at the same time as adsorption agents.

Instead of effecting neutralization, regeneration by esterification can also be employed, by adding small quantities of alcohol as long as they are consumed and there is not sufficient free alcohol remaining in the stabilizing liquid capable of bringing about hydrolysis of the cellulose ester.

Some of the above-mentioned compounds, being suitable for effecting the selective elimination, have a marked solvent power for cellulose esters with low content of acyl radicals. In order to avoid the possible partial dissolution of the cellulose ester during the elimination of the sulpho-radicals, indifferent diluents may be added to the eliminating agents which prevent dissolution. Among these diluents may be mentioned the hydrocarbons and their derivatives, such as benzene and its derivatives. The addition of such diluents, however, has to be made only to a degree such that the mixture maintains a sufficient solvent power for sulphuric acid. The same diluent may also be chosen for the liquid used as agent for eliminating the radicals and as diluting agent of the esterification bath, which may sometimes present particular advantages. In the examples given below a few combinations of this kind will be indicated, but it is to be distinctly understood that the invention is in no way limited to the examples given.

The process according to the present invention is not exclusively limited to the production of simple organic esters of cellulose; it can also serve for producing mixed esters containing two or more kinds of organic acyl radicals, or inorganic and organic acyl radicals at the same time, such as for instance for producing nitroacetates having a total content of acyl radicals lower than that of the triester.

It is known that, by the heterogeneous methods which have been known up to now, cellulose esters having elevated content of acyl radicals nearing that of the triester can economically be obtained, but up to now it has been impossible to produce by these processes products having contents of acyl radicals which are markedly lower than those which correspond to the triester, whereas according to the present invention esters having the fibrous texture preserved, with acyl indices varying, for instance in the case of cellulose acetate, from 58 to 61%, can be produced without difficulty, the products thus obtained being perfectly homogeneous as regards their contents of acyl radicals.

Even when foregoing the advantages inherent in the application of the esterification methods which preserve the fibrous texture and accepting the disadvantages presented by the application of the solvent methods, it is difficult to obtain products having, for instance, in the case of an acetate, a content of acetic acid greater than 58% or having a corresponding content of acyl radicals of another kind, in view of the difficulties created by the precipitation of such highly esterified products, as these form, when precipitated, gelatinous masses which obstinately retain the esterifying mixture and oppose a great resistance to the complete deswelling by washing.

However, because of their favourable physical properties, it is precisely the cellulose esters having elevated contents of acyl radicals, corresponding to 58–61% in the case of acetate, which present a great advantage in the making of products thereof, such as threads, films, plastic material, varnishes, etc. They are in fact not hygroscopic, and have a great elasticity, an elevated melting point, a large dielectric constant, and a low dielectric loss factor.

*Examples*

(1) 1 part (by weight) of linters is first treated with 12 parts of acetic acid (of 98.7% concentration) during twelve hours, and the excess of the liquid removed by squeezing until the weight of the mass is 2.6 parts. The acetylation is effected by a mixture, preliminarily cooled down to +5° C., containing 8.8 parts of benzene, 2 parts of acetic acid, 3 parts of acetic anhydride and 0.16 part of sulphuric acid (density=1.84). At the start of the acetylation, cooling is effected; later the temperature is raised gradually up to +25° C. As soon as the fibrous acetate becomes distinctly soluble in a mixture of nine parts of methylene-chloride and one part of alcohol, the acetylation bath is removed, by squeezing, displacement, centrifuging or any other appropriate technical method. The product is washed three times at low temperature with ethyl acetate, and is extracted repeatedly with a boiling mixture of equal parts of ethyl acetate and benzene, for instance in an apparatus working according to the Soxhlet principle. A fibrous acetate is thus obtained which turns yellow at +235° C. during the stabilization test, and has an acetic acid content of 59.1%. The Oswald viscosimeter indicates, for a solution of ½% in 95% formic acid, a relative viscosity of 3.0 at a temperature of +20° C.

(2) 1 part (by weight) of linters is treated first with 12 parts of 98.7% acetic acid and then the mixture reduced by removal of acid to a weight of 6 parts. The acetylation is carried out with a mixture containing 9.6 parts of benzene, 3 parts of acetic anhydride, 1 part of acetic acid and 0.1 part of sulphuric acid (density=1.84) which has been preliminarily cooled down to +7° C. During the acetylation, the temperature is gradually raised up to +27° C. After acetylation has been completed two treatments of one hour each with pure ethyl acetate at room temperature is effected, followed by four treatments of two hours each with pure ethyl acetate at boiling temperature; the ethyl acetate is renewed for each treatment. A fibrous acetate is thus obtained which is soluble in a mixture of nine parts methylene chloride and one part of alcohol, turns yellow at +244° C., and has an acetic acid content of 60.4% and a relative viscosity of 3.4. By treating this acetate with acetone, 2 fractions are obtained, the acetic acid contents of which vary from one fraction to the other by 0.7%. The stability attained extends up to +255° C., if the treatment at elevated temperature is effected by means of boiling butyl acetate. Instead of using ethyl acetate, ethyl propionate, ethyl oxalate, cyclohexyl acetate, amyl formate and so forth may also be used. In order to stabilize with glycol diacetate or with methylglycol acetate, which have a solving power towards cellulose acetate, the treatment must be effected in the presence of a diluent.

(3) 1 part (by weight) of linters is treated first with 12 parts of 99.1% acetic acid; the mass is reduced by removal of liquid to a weight of 2.2 parts and is then treated at +19° C., during 1½ hours, with a mixture containing 10 parts of 98.5% acetic acid and 0.12 part of sulphuric acid (density=1.84). The mass is reduced by removal of liquid to a weight of 3.2 parts and the acetylation is effected first at +5° C., then at gradually raised temperature up to +25° C., with an acetylating mixture comprising 8.6 parts isopropyl acetate, 3.2 parts acetic anhydride and 0.068 part sulphuric acid (density=1.84). As soon as a sample gives a clear solution in the methylene-chloride-alcohol mixture, the acetylating bath is removed and the mass washed three times with isopropyl acetate. Finally, an extraction at elevated temperature with isopropyl acetate is carried out during one hour, the latter being separated and its regeneration effected by a treatment with precipitated barium carbonate. The isopropyl acetate can thus be used for another extraction. The second treatment takes two hours; the following third and fourth treatments after preliminary regenerations of the isopropyl acetate by means of barium carbonate, take three hours. After the last treatment, the last residues of the isopropyl acetate are expelled by means of steam and the fibrous acetate is dried. The latter turns yellow at 235° C., shows an acetic acid content of 60.5% and a viscosity of 3.6. By treatment with acetone two fractions are obtained; the variation of the acetic acid content between one fraction and the other is 0.6%.

If ethyl acetate is used in this example instead of isopropyl acetate, then the variation of the acetic acid content between one fraction and the other, is but 0.1%. Should the quantity of acetic anhydride in this example be increased up to 3.8 parts, the acetic acid content of the final product attains 61%, and the viscosity decreases to a value of 2.9.

(4) 1 part (by weight) of linters is first treated with 12 parts of 99.1% acetic acid, the mass then being reduced by removal of liquid to a weight of 2.4 parts. The second treatment is carried out with a mixture of 10 parts of 98.5% acetic acid and 0.11 part of sulphuryl chloride. After 2½ hours, the mass is reduced by removal of liquid to 2.4 parts and acetylation effected first with cooling, then with gradual increase of temperature, by means of a mixture of 8 parts of benzene and 3 parts of acetic anhydride. When the acetylation is finished, the excess of liquid is removed by squeezing, then the mass is washed three times at room temperature with ethyl acetate, and four times at elevated temperature with ethyl acetate which is renewed after each operation. A product is thus obtained having an acetic acid content of 61%, turning yellow at 230° C. and the viscosity of which is 3.5. Fractionating with acetone gives acetates of an acetic acid content which varies from one product to another, only by 0.2%.

(5) 1 part (by weight) of linters is first treated during 24 hours, at +20° C., with 10 parts of 98.6% acetic acid, and then the mass is centrifuged until its weight is reduced to 2.3 parts. There is then introduced in the centrifuging machine a mixture composed of 8.3 parts of 98.5% acetic acid and of 0.12 part of sulphuric acid (density=1.84), and treatment is then carried out at low centrifuge speed at +18° C. during 2½ hours. Centrifuging is carried out until the weight of the mass is reduced to 2.3 parts, and acetylation is then effected in the centrifuging machine during 10 hours with a mixture cooled down to +8° C. comprising 2.8 parts of 92% acetic anhydride, 6 parts of benzene, 1.5 parts ethyl acetate, 0.33 part of acetic acid and 0.03 part of sulphuric acid (density=1.84). Immediately after removal of the acetylating liquid, washing is effected, three times at room temperature with a mixture composed of two parts benzene and one part ethyl acetate, then repeatedly at elevated temperature with a mixture of the same composition. After each treatment, centrifuging is effected. After the last centrifuging operation, the final residues of benzene and ethyl acetate are evaporated by means of steam, and the product washed with hot water and dried. All the steps of the treatment above described are effected in the same centrifuging machine. The product obtained shows the yellowing point of 240° C., has acetic acid contents of 60.3% and a viscosity of 3.0.

If, while working according to this example, acetic acid containing less water is used for the acetic acid-sulphuric acid mixture, a product of lower viscosity is obtained.

(6) One part (by weight) of linters is well soaked with an excess of acetic acid. The mass is left at rest for 12 mours; then by squeezing the excess of liquid is removed until the weight of the mass is reduced to 2.4 parts, and during two hours the mass is treated with a mixture of 10 parts of 98.5% acetic acid and 0.1 part sulphuric acid (density =1.84). The mass reduced by removal of liquid to a weight of 2.2 parts is acetylated, first at low temperature, then between +25° C. and 30° C., by means of a mixture composed of 3.2 parts of acetic anhydride, 8.6 parts of ethylglycol acetate and 0.05 part of sulphuric acid.

When the acetylation is finished the acetylating mixture is eliminated by squeezing, centrifuging, displacement, or any other appropriate technical means, and the acetylated fibres treated first twice at low temperature, then three times at +100° C., with ethylglycol acetate, the latter being renewed for each operation, unless regeneration is effected. The first treatment at elevated temperature takes one hour, the next two treatments 2 hours each. The acetate, finally well washed with warm water, shows after drying the yellowishing point of 265° C. and acetic acid contents of 60.8%.

If a sample acetylated according to the above-described method is treated for a few hours in an apparatus of the Soxhlet type with ethyl acetate heated to the boiling point, this sample after being preliminarily washed twice at low temperature with ethylglycol acetate, shows, after drying a yellowishing point of 240° C.

(7) 1 part (by weight) of linters is first treated with 12 parts of 98.1% acetic acid, then reduced by removal of liquid to a weight of 2.4 parts and treated at +18° C. for two hours with a mixture of 10 parts of 98.5% acetic acid and 0.08 part sulphuric acid. The weight is then reduced by removal of liquid to 2 parts and the product acetylated by means of a mixture composed of 9 parts benzene, 2 parts acetic acid, 1.5 parts acetic anhydride and 0.04 part sulphuric acid, at gradually increasing temperature until the anhydride is almost completely exhausted.

The fibrous mass is then separated from the acetylating mixture, which is replaced by another having the following composition; 9 parts benzene, 1 part acetic acid, 1.8 parts acetic anhydride and 0.08 part sulphuric acid (density =1.84). The acetylation is completed by means of this mixture. The acetylated product is washed and treated at elevated temperature with pure ethyl acetate. A fibrous acetate is thus obtained, having an acetic acid content of 60% and turning yellow at 230° C.

(8) 1 part (by weight) of linters is treated first with an excess of acetic acid, then reduced by removal of liquid to a weight of 2.5 parts and acetylated, first at low temperature, and then at progressively increasing temperatures, with a mixture composed of 9 parts benzene, 3 parts acetic anhydride, 2 parts acetic acid, 0.1 part sulphuric acid (density=1.84) and 0.02 part perchloric acid. The acetylated product is then treated according to the preceding examples. A fibrous acetate is thus obtained which turns yellow at 240° C. and has an acetic acid content of 60.5%.

We claim:

1. In the manufacture by the non-solvent method of cellulose esters having acyl radical contents substantially lower than that of the tri-ester, the process which comprises treating cellulose with a sulfonating agent and with an acylating agent under conditions favoring the formation of a mixed sulfuric-acid-acyl tri-ester of cellulose of an acyl content not substantially exceeding about 61 per cent by weight of the sulfuric acid-free acyl ester, expressed in terms of equivalents of acetic acid, the quantity of sulfonating agent employed being greater than that necessary for catalyzing the acylating process, then eliminating the sulfuric-acid-content only, of said mixed ester by steps including the treatment of said ester with at least one substance selected from the group consisting of compounds containing at least one esterified acyl group and compounds containing in addition to at least one esterified acyl group at least one substituent ether group, under conditions preventing further acylation or the substitution of acyl groups for the eliminated sulfuric acid groups, whereby the ester obtained contains an acyl content not substantially exceeding that of the said mixed sulfuric acid-acyl ester.

2. The process of claim 1 wherein the said cellulose is pretreated, without being dissolved, in a bath containing a sulfonating agent under conditions producing partial sulfonation of said cellulose.

3. The process of claim 1 wherein the sulfonating agent employed is sulfuric acid and wherein this acid also serves as esterification catalyst.

4. The process of claim 1 wherein the mixed tri-ester before being treated with the compound containing at least one esterified acyl group, is washed for removal of residues of the acylating bath by an inert solvent for said sulfonating agent.

5. In the manufacture by the non-solvent method of cellulose acetates having contents of acetic acid ranging from about 58 to 61 per cent by weight, the process which comprises treating cellulose with a sulfonating agent and with an acetylating agent under conditions favoring the formation of a mixed sulfuric-acid-acetic-acid tri-ester of cellulose of an acetic acid content ranging from about 58 to 61 percent by weight of the sulfuric acid-free ester, the quantity of sulfonating agent employed being greater than that necessary for catalyzing the acetylating process, then eliminating the sulfuric acid content only of said mixed ester by steps including the treatment of said ester with at least one substance selected from the group consisting of compounds containing at least one esterified acyl group and compounds containing in addition to at least one esterified acyl group at least one substituent ether group, under conditions preventing further acetylation or the substitution of acetyl groups for the eliminated sulfuric acid groups.

OTTO SINDL.
GEORG FRANK.